US010336894B2

(12) United States Patent
Steenbakkers-Menting et al.

(10) Patent No.: US 10,336,894 B2
(45) Date of Patent: Jul. 2, 2019

(54) POLYPROPYLENE COMPOSITION COMPRISING NUCLEATING AGENT

(71) Applicant: SABIC GLOBAL TECHNOLOGIES B.V., Bergen op Zoom (NL)

(72) Inventors: Henrica Norberta Alberta Maria Steenbakkers-Menting, Geleen (NL); Maria Soliman, Geleen (NL); Franciscus Elisabeth Jacobus Essers, Geleen (NL); Kathleen Ann Vandewiele, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 51 days.

(21) Appl. No.: 15/532,167

(22) PCT Filed: Nov. 26, 2015

(86) PCT No.: PCT/EP2015/077791
§ 371 (c)(1),
(2) Date: Jun. 1, 2017

(87) PCT Pub. No.: WO2016/087308
PCT Pub. Date: Jun. 9, 2016

(65) Prior Publication Data
US 2017/0267854 A1 Sep. 21, 2017

(30) Foreign Application Priority Data
Dec. 2, 2014 (EP) ..................................... 14195839

(51) Int. Cl.
C08L 23/12 (2006.01)
C08L 51/00 (2006.01)
C08L 51/06 (2006.01)
C08L 23/26 (2006.01)
C08L 23/10 (2006.01)
C08J 3/22 (2006.01)
C08K 3/34 (2006.01)
C08K 9/04 (2006.01)

(52) U.S. Cl.
CPC .............. C08L 23/12 (2013.01); C08J 3/226 (2013.01); C08K 3/34 (2013.01); C08K 9/04 (2013.01); C08L 23/10 (2013.01); C08L 23/26 (2013.01); C08L 51/003 (2013.01); C08L 51/06 (2013.01); C08J 2323/10 (2013.01); C08J 2423/10 (2013.01); C08J 2423/26 (2013.01); C08L 2310/00 (2013.01); C08L 2314/00 (2013.01)

(58) Field of Classification Search
CPC ........... C08L 23/12; C08L 23/10; C08L 51/06
See application file for complete search history.

(56) References Cited

U.S. PATENT DOCUMENTS

| 4,399,054 | A | 8/1983 | Ferraris et al. | |
| 4,472,524 | A | 9/1984 | Albizzati | |
| 5,665,820 | A * | 9/1997 | Leistner | ................ C08F 255/02 525/63 |
| 2009/0130443 | A1 | 5/2009 | Lustiger | |
| 2013/0116353 | A1* | 5/2013 | Jang | ........................ C08L 77/02 521/91 |
| 2013/0171420 | A1* | 7/2013 | Yokota | .................. B32B 15/085 428/167 |
| 2014/0066565 | A1* | 3/2014 | Jeong | ...................... C08L 23/12 524/451 |
| 2015/0232643 | A1* | 8/2015 | Herklots | .................. C08K 5/52 264/523 |
| 2015/0299442 | A1* | 10/2015 | Horill | ..................... C08L 23/12 524/451 |

FOREIGN PATENT DOCUMENTS

| CN | 101735508 A | 6/2010 |
| KR | 101383621 B1 | 4/2014 |
| WO | 2006010414 A1 | 2/2006 |
| WO | 2009130200 A1 | 10/2009 |

OTHER PUBLICATIONS

International Search Report for International Application No. PCT/EP2015/077791; International Filing Date: Nov. 25, 2015; dated Jan. 28, 2016; 3 Pages.
Libster et al., "Advanced Nucleating Agents for Polypropylene," Polym. Adv. Technol. 2007, 18: 685-695.
Machine Translation of KR101383621; Date of Publication: Apr. 10, 2014; 13 Pages.
Written Opinion of the International Searching Authority for International Application No. PCT/EP2015/077791; International Filing Date: Nov. 25, 2015; dated Jan. 28, 2016; 4 Pages.
Chinese Office Action Application No. 201580073709.7; dated Mar. 5, 2019; pp. 36 which cites CN101735508A and CN102076758A.

* cited by examiner

Primary Examiner — Jeffrey C Mullis
(74) Attorney, Agent, or Firm — Cantor Colburn LLP

(57) ABSTRACT

The invention is directed to a polypropylene composition comprising (A) a propylene-based polymer, (B) talc and (C) a functionalized polypropylene grafted with an acid or acid anhydride functional group, wherein components (A) and (C) are different, wherein the amount of the talc in the composition is 0.025-4 wt % of the total composition and the amount of the functionalized polypropylene is 0.005-0.75 wt % of the total composition.

19 Claims, No Drawings

POLYPROPYLENE COMPOSITION COMPRISING NUCLEATING AGENT

CROSS REFERENCE TO RELATED APPLICATIONS

This application is a 371 of International Application No. PCT/EP2015/077791, filed Nov. 26, 2015, which claims priority to European Application No. 14195839.7, filed Dec. 2, 2014.

The invention relates to a composition comprising a propylene-based polymer and a nucleating agent, to a process for obtaining such composition, to the use of such composition, to an article comprising the composition and to a nucleating agent.

Nucleating agents are chemical compounds or compositions that enable faster nucleation or a higher crystallization temperature of thermoplastic polymers, resulting in productivity gains during their processing and in improved mechanical and physical properties of articles made from such thermoplastics. These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate. An overview of nucleating agents used in polypropylene-based compositions is given for example in *Polym. Adv. Technol.* 2007, 18, 685-695. However, it is commonly recognized that the use of nucleating agents is a highly unpredictable technology area. Small changes in a molecular structure of the nucleator can drastically alter the ability of a nucleating agent to effectively nucleate a polymer composition. A lot is not unknown regarding the effect of a nucleating agent on polymer morphology during (re-)crystallization of thermoplastics.

There is a demand for a propylene composition which can be processed into articles in a less energy intensive manner. There is further a demand for improving the mechanical properties of a propylene composition such as flexural modulus, tensile strength and elongation at break.

It is an object of the invention to provide a composition which can be processed into articles in a less energy intensive manner. It is a further object of the invention to provide a composition which results in articles having good mechanical properties such as flexural modulus, tensile strength and elongation at break.

This object is achieved by a polypropylene composition comprising (A) a propylene-based copolymer, (B) talc and (C) a functionalized polypropylene grafted with an acid or acid anhydride functional group, wherein components (A) and (C) are different, wherein the amount of the talc in the composition is 0.025-7.5 wt % of the total composition and the amount of the functionalized polypropylene is 0.005-2.5 wt % of the total composition.

Preferably, the object is achieved by a polypropylene composition comprising (A) a propylene-based copolymer, (B) talc and (C) a functionalized polypropylene grafted with an acid or acid anhydride functional group, wherein components (A) and (C) are different, wherein the amount of the talc in the composition is 0.025-4 wt % of the total composition and the amount of the functionalized polypropylene is 0.005-0.75 wt % of the total composition.

Surprisingly, it has been found that a polypropylene composition can be prepared having a high crystallization temperature by the addition of talc and a functionalized polypropylene grafted with an acid or acid anhydride functional group, i.e. the talc and the functionalized polypropylene act as a nucleating agent. The injection moulding or extrusion of a composition with a higher crystallization temperature does not require cooling of the mould to low temperature for the crystallization and solidification of the composition. This has the advantage of saving energy and increasing the cycle time, especially for injection moulding.

It is known that talc acts as a nucleating agent. However, it was surprisingly found that the functionalized polypropylene further increases the effect of the talc for increasing the crystallization temperature.

Additionally, the composition according to the present invention has good elongation at break.

Additional advantages of the composition according to the present invention may include improved mechanical properties such as flexural modulus and tensile strength. Further, the composition according to the present invention may have a relatively high MFI sufficient for easy processing.

It is noted that KR101383621 discloses a recycled polypropylene polymer composite material comprising 1-5 pts. wt. maleic anhydride grafted polypropylene with respect to 100 pts. wt. polymer resin mixture containing 75-85 wt. % recycled polypropylene, 5-20 wt. % talc and 1-10 wt. % nanoclay masterbatch. US2009/130443 discloses synthetic organic fiber pellets comprising at least 80 wt % of PET and 2-20 wt % of one or more waxes. In example 4, PET fiber pellets comprising polypropylene wax, polypropylene powder and talc as well as other additives such as 5% maleic anhydride modified polypropylene and 0.20% slip agent were extruded. Talc level was at 20%.

In KR101383621 and US2009/130443, the amount of the talc and the amount of the maleic anhydride grafted polypropylene are higher than in the composition according to the present invention. KR101383621 and US2009/130443 do not mention the effect of the combination of talc and maleic anhydride grafted polypropylene as a nucleating agent, such as increasing the crystallization temperature. According to the present invention, it was surprisingly found that the addition of small amounts of talc and functionalized polypropylene leads to a significant increase in the crystallization temperature as well as flexural modulus. It was further found according to the invention that larger amounts of talc and functionalized polypropylene leads to a decrease in elongation at break. According to the invention, such decrease in elongation at break by the large amounts of talc and functionalized polypropylene is advantageously avoided.

(A) Propylene-Based Polymer

The major part of the composition according to the invention is (A) propylene-based polymer. Typically, the amount of the propylene-based polymer is 70-99.97 wt % of the total composition, more typically 80-99.9 wt %, 85-99 wt %, 90-98 wt % or 95-97 wt %.

The component (A) propylene-based polymer is a different type of propylene polymer from (C) a functionalized polypropylene grafted with an acid or acid anhydride functional group. Preferably, component (A) is non-grafted polypropylene, for example propylene homopolymer or random propylene copolymer. The random propylene copolymer may be a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix. Preferably, the α-olefin in the propylene-α- olefin copolymer is selected from the group of α-olefins having 2 or 4-10 carbon atoms and is preferably ethylene. Most preferably, component (A) is propylene homopolymer. The propylene homopolymer or random propylene copolymer may have an MFI of 0.1-100 dg/min, e.g. 1-70 dg/min, e.g. 10-60 dg/min, e.g. 35-50 dg/min, measured according to ISO1133 (2.16 kg/230° C.).

Alternatively, component (A) may be a heterophasic propylene copolymer, also known as an impact propylene copolymer or a propylene block copolymer. Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524.

The heterophasic propylene copolymer of the composition of the invention consists of a propylene-based matrix and a dispersed ethylene-α-olefin copolymer. The propylene-based matrix typically forms the continuous phase in the heterophasic propylene copolymer.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms and is preferably ethylene.

Preferably, the propylene-based matrix consists of a propylene homopolymer.

The melt flow index (MFI) of the propylene-based matrix (before it is mixed into the composition of the invention) may be in the range of for example 0.3 to 200 dg/min, for example from 0.3 to 80 dg/min measured according to ISO1133 (2.16 kg/230° C.), for example in the range from 3 to 70, for example in the range from 10 to 60 dg/min, for example in the range from 15 to 40 dg/min. Preferably, the MFI of the propylene-based matrix is at least 0.1 dg/min, for example at least 0.2 dg/min, for example at least 0.3 dg/min, and/or for example at most 10 dg/min, at most 5 dg/min, at most 2 dg/min, at most 0.6 dg/min or at most 0.5 dg/min. Preferably, the MFI of the propylene-based matrix is 0.2-0.5 dg/min.

The propylene-based matrix is present in an amount of 60 to 95 wt %, for example 65 to 94 wt %, for example 70 to 93 wt %, for example 75 to 92 wt % based on the total heterophasic propylene copolymer. Preferably, the propylene-based matrix is present in an amount of 90 to 95 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.5 to 10 microns, as may be determined by transmission electron microscopy (TEM).

The MFI of the dispersed ethylene α-olefin copolymer (before it is mixed into the heterophasic propylene copolymer) may for example be in the range from 0.001 to 10 dg/min (measured according to ISO1133 (2.16 kg/230° C.)), preferably in the range from 0.006 to 5 dg/min.

The MFI of the dispersed ethylene α-olefin copolymer ($MFI_{EPR}$) may also be calculated taking into account the MFI of the propylene-based matrix ($MFI_{PP}$), the MFI of the heterophasic propylene copolymer (MFIheterophasic) and matrix content (amount of the matrix in the heterophasic propylene copolymer) and rubber content (RC) (amount of the matrix and the dispersed ethylene-α-olefin copolymer in the heterophasic propylene copolymer) according to the following formula:

$$MFIEPR = 10^{\wedge}\left(\frac{\text{Log } MFIheterophasic - \text{matrix content} * \text{Log } MFIPP}{\text{rubber content}}\right)$$

Preferably, the MFI of the dispersed ethylene α-olefin copolymer is at least 0.001 dg/min, for example at least 0.005 dg/min, and/or for example at most 4 dg/min, at most 3 dg/min, at most 2 dg/min, at most 1 dg/min, at most 0.5 dg/min, at most 0.4 dg/min, at most 0.3 dg/min, at most 0.2 dg/min or at most 0.1 dg/min, measured according to according to above formula or ISO1133 (2.16 kg/230° C.).

The dispersed ethylene-α-olefin copolymer is present in an amount of 40 to 5 wt %, for example in an amount of 35 to 6 wt % based on the total heterophasic propylene copolymer, for example in an amount of at least 7 wt % and/or for example in an amount of at most 10 wt % based on the total heterophasic propylene copolymer. Preferably, the dispersed ethylene-α-olefin copolymer is present in an amount of 5-10 wt % based on the total heterophasic propylene copolymer.

In the heterophasic polypropylene in the composition of the invention, the sum of the total weight of the propylene-based matrix and the total weight of the dispersed ethylene-α-olefin copolymer is 100 wt %

Preferably, the amount of ethylene in the ethylene-α-olefin copolymer is in the range of 15-65 wt % based on the ethylene-α-olefin copolymer. More preferably, the amount of ethylene in the ethylene-α-olefin copolymer is 20-62 wt %, more preferably 30-60 wt %, based on the ethylene-α-olefin copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Preferably, the heterophasic propylene copolymer according to the invention has an MFI of 0.1-100 dg/min, more preferably 0.1-70 dg/min, more preferably 0.1-50 dg/min, more preferably 0.1-10 dg/min, more preferably 0.1-5 dg/min, more preferably 0.1-2.0 dg/min, more preferably 0.2-0.5 dg/min, more preferably 0.3-0.5 dg/min. Preferably, the heterophasic propylene copolymer according to the invention has an MFI of 0.1-0.5 dg/min. The MFI is determined according to ISO1133 at 230° C. and 2.16 kg.

(B) Talc

Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. Talcs suitable for use as additives to a heterophasic propylene copolymer are commercially available from for example Imerys Luzenac. 'Talc' and 'talcum' are used interchangeably herein.

Talc is available in several particle sizes, for example the particle sizes of talc are classified as 'ultrafine' (average particle size $d_{50}$ of lower than 1 μm, for example an average particle size $d_{50}$ in the range of 0.5 to 0.9 μm) and 'fine' (average particle size $d_{50}$ of at least 1 μm, for example an average particle size $d_{50}$ of 1 μm to 5 μm). Preferably, fine or ultrafine powder particles are used in the process of the present invention.

The average particle size $d_{50}$ is determined according to ISO 13317-3. The $d_{50}$ may be measured by sedimentation analysis, according to Stoke's Law using an apparatus from Sedigraph.

The amount of talc in the composition is 0.025-7.5 wt % based on the total composition. When the amount of talc is too high, elongation at break becomes too low. Depending on the desired stiffness, the amount of talc used may be varied. For practical reasons, the amount of talc in the composition of the invention is preferably at most 5 wt % based on the total composition. Further, for avoiding a large decrease in the elongation at break, preferably, the amount of talc in the composition is at most 4 wt %, at most 3.5 wt % or at most 3 wt %, based on the total composition. For example, the amount of talc in the composition is at least 0.05 wt %, at least 0.1 wt %, at least 0.25 wt %, at least 0.5 wt %, at least 1 wt %, at least 1.5 wt % or at least 2 wt %, based on the total composition. Particularly preferred amount of the talc in the composition is 0.1-4 wt %, for example 0.1-1 wt % based on the total composition. In these ranges, a particularly high increase in the crystallization temperature and flexural modulus are obtained while avoiding a large decrease in the elongation at break.

Preferably, at least part of the talc is surface-modified. The combination of the surface-modified talc and the functionalized polyolefin was found to further increase the crystallization temperature and may improve mechanical properties such as flexural modulus, impact strength, tensile strength and elongation at break.

Other words that are commonly used for surface-modified talc are surface-treated talc or surface coated talc. Surface-modified talc's are known to the person skilled in the art and are commercially available from for example Imerys Luzenac. Surface-modified talcs may be prepared by adding a surface modifier to the talc. The nature and concentration of the modifier depends on the desired benefit in the final talc composite, like improvement of the bond between the talcum and polymer or to improve the dispersion of the talc in the polymer. Examples of surface modifiers are silanes, amines, glycols, stearates, sorbates, titanates and amides. An example of the amides is ethylene-bis-stearamide.

Preferably, the surface-modified talc is a talc that is surface-modified with a polar substance selected from the group of glycols, silanes, amines and amides.

Preferably, at least part of the talc is surface-modified, that means that mixtures of surface-modified talc with non-surface modified talc may also be used. Preferably, at least 80 wt % of the talc used in the process of the invention or present in the composition of the invention is surface-modified, more preferably at least 90 wt %, even more preferably at least 95 wt %, in particular at least 98 wt %, more in particular at least 99 wt %, most in particular all talc used in the process of the invention or present in the composition of the invention is surface-modified. The higher the wt % of surface-modified talc based on the talc used, the higher degree of increase in the crystallization temperature is observed.

(C) Functionalized Polypropylene

The composition according to the invention comprises (C) 0.005-2.5 wt % of a functionalized polypropylene grafted with an acid or acid anhydride functional group based on the total weight of the composition. The polypropylene may be a propylene homopolymer or a propylene copolymer. The propylene copolymer may be a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix. Preferably, the α-olefin in the propylene-α-olefin copolymer is selected from the group of α-olefins having 2 or 4-10 carbon atoms and is preferably ethylene. Examples of the acid or acid anhydride functional groups include (meth)acrylic acid and maleic anhydride. A particularly suitable material is for example maleic acid functionalized propylene homopolymer (for example Exxelor PO 1020 supplied by Exxon).

The amount of the functionalized polypropylene in the composition is preferably 0.01-2.0 wt %, for example 0.02-1.5 wt %, 0.05-1.0 wt %, 0.1-0.75 wt % or 0.2-0.5 wt %, based on the total composition. Preferably, the amount of the functionalized polypropylene in the composition is preferably 0.005-0.75 wt %, for example at least 0.01 wt %, at least 0.02 wt %, at least 0.05 wt %, at least 0.1 wt % or at least 0.2 wt % and/or for example at most 0.5 wt %, based on the total composition. Particularly preferred amount of the functionalized polypropylene in the composition is 0.01-0.5 wt % based on the total composition.

The weight ratio between the talc and the functionalized polypropylene is typically 100:1 to 10:1, for example 50:1 to 20:1.

(D) Optional Components

The composition according to the invention may optionally comprise at least one optional component (D).

Examples of optional components (D) are known additives. The amount of the optional component (D) is typically 0 to 30 wt % of the total of the composition.

Additives

As additives, the compositions may contain clarifiers, release agents, pigments, dyes, plasticizers, anti-oxidants, antistatics, scratch resistance agents, high performance fillers, impact modifiers, flame retardants, blowing agents, recycling additives, coupling agents, anti microbials, anti-fogging additives, slip additives, anti-blocking additives, polymer processing aids such as lubricants and the like, surface tension modifiers, co-agents, for example 1, 4-butanediol dimethacrylate (BDDMA), acrylate or methacrylate, inorganic filler such as glass beads or glass fibers, mica, calcium carbonate, wollastonite. It will be appreciated that the term "inorganic filler" herein does not include talc. Such additives are well known in the art. Depending on the type of the propylene-based polymer, peroxides may further be added; for example, when the propylene-based polymer is a heterophasic propylene copolymer, peroxides may be added to increase the melt flow rate. When a peroxide is used, the amount of peroxide will typically lie in the range of 0.02 to 0.5 wt % based on the heterophasic propylene copolymer. The skilled person can readily select any suitable combination of additives and additive amounts without undue experimentation. The amount of additives depends on their type and function. Typically, their total amounts will be from 0 to 30 wt %, for example from 0 to 20 wt %, for example from 0 to 10 wt %, from 0 to 5 wt %, from 0 to 3 wt %, from 0 to 2 wt % or from 0 to 1 wt %, from 0 to 0.5 wt % or from 0 to 0.1 wt %, based on the total composition. Most typically, their amounts are from 0.1 to 1 wt %, based on the total composition.

The sum of all components added in the process of the invention to form the composition comprising (A) the propylene-based polymer, (B) the talc, (C) the functionalized polypropylene and (D) the optional components should add up to 100% by weight.

Preferably, the total of components (A), (B) and (C) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

In some embodiments, the composition according to the invention comprises glass beads or glass fibers as an additional component to components (A), (B) and (C). The amount of the glass beads or glass fibers may e.g. be 5 to 30 wt %, e.g. 10 to 25 wt %, e.g. 15 to 20 wt %. The invention further relates to a composition comprising no or little amount of glass beads or glass fibers as an additional component to components (A), (B) and (C). The amount of the glass beads or glass fibers may e.g. be at most 5 wt %, at most 3 wt %, at most 1 wt %, at most 0.5 wt %, at most 0.1 wt % or 0 wt %.

In some embodiments, the composition according to the invention comprises impact modifiers such as ethylene-α-olefin copolymer as an additional component to components (A), (B) and (C). The amount of the impact modifiers may e.g. be 5 to 30 wt %, e.g. 10 to 25 wt %, e.g. 15 to 20 wt %. The invention further relates to a composition comprising no or little amount of impact modifiers such as ethylene-α-olefin copolymer in the composition according to the invention may be at most 5 wt %, at most 3 wt %, at most 1 wt %, at most 0.5 wt %, at most 0.1 wt % or 0 wt %.

Process

The composition of the invention may be obtained by a process comprising melt-mixing (A) the propylene-based polymer, (B) the talc, (C) the functionalized polypropylene and (D) the optional component by using any suitable means. Accordingly, the invention further relates to a process for the preparation of the composition according to the invention comprising melt mixing (A), (B) and (C) and optionally (D). Preferably, the composition of the invention is made in a form that allows easy processing into a shaped article in a subsequent step, like in pellet or granular form. The composition can be a mixture of different particles or pellets; like a blend of the polypropylene-based polymer and a masterbatch of additives. Preferably, the composition of the invention is in pellet or granular form as obtained by mixing all components in an apparatus like an extruder; the advantage being a composition with homogeneous and well-defined concentrations of the additives.

Preferably, the process according to the invention comprises the steps of: preparing a masterbatch by melt-mixing a portion of (A) the propylene-based polymer, (B) the talc, (C) the functionalized polypropylene and melt-mixing the masterbatch and remainder of (A) the propylene-based polymer. It was surprisingly found that lower amounts of (B) and (C) were necessary for achieving the same degree of increase of the crystallization temperature.

With melt-mixing is meant that the components (B), (C) and optional (D) are mixed with (A) propylene-based polymer at a temperature that exceeds the melting point of (A) the propylene-based polymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may not lead to compositions with the desired melt flow index; too high temperatures may induce undesired degradation processes, which may for example result in compositions having poor mechanical properties. Likewise, the screw speed of the extruder may be varied as needed. Typical screw speeds are in the range from about 100 rpm to about 400 rpm.

Properties

The composition according to the invention may have an MFI which is not largely different from the MFI of the heterophasic propylene copolymer. Preferably, the composition according to the invention has an MFI of 0.1-100 dg/min, e.g. 1-70 dg/min, e.g. 10-60 dg/min, e.g. 35-50 dg/min, measured according to ISO1133 (2.16 kg/230° C.).

The composition according to the invention has a relatively high crystallisation temperature, a high flexural modulus, a high tensile strength and a high elongation at break.

The crystallisation temperature is preferably at least 120° C. determined by DSC according to ISO 11357-1 to ISO11357-5 using a first heating step at a heating rate of 10° C. per minute up to 200° C., a dynamic crystallization at a cooling rate of 10° C. per minute down to 25° C. and a second heating step at a heating rate of 10° C. per minute up to 200° C., more preferably at least 122° C., most preferably at least 125° C.

The flexural modulus is preferably at least 1700 N/mm², determined according to ASTM D790-10. The flexural modulus can be determined parallel (II) or perpendicular (L). The flexural modulus is more preferably at least 1800 N/mm², most preferably at least 1900 N/mm².

The tensile strength is preferably at least 35 N/mm², determined according to ISO 37/2.

The elongation at break is preferably at least 12%, determined according to ISO 527/1A.

The composition according to the invention preferably has a crystallization temperature at least 120° C., determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C. and at least one of a flexural modulus of at least 1700 N/mm² determined according to ASTM D790-10; a tensile strength of at least 35 N/mm² determined according to ISO 37/2 and an elongation at break of at least 12% determined according to ISO 527/1A.

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, thermoforming or thin-walled injection moulding.

The invention further relates to an article comprising the composition according to the invention. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

The invention also relates to the use of talc and a functionalized polypropylene grafted with an acid or acid anhydride functional group for increasing the crystallization temperature, determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., of a composition comprising a propylene-based polymer. The increase in the crystallization temperature is preferably at least 1.5° C. Preferably, the amount of the talc in the composition is 0.025-7.5 wt % of the total composition and the amount of the functionalized polypropylene is 0.005-2.5 wt % of the total composition. Preferably, the amount of the talc in the composition is 0.025-4 wt % of the total composition and the amount of the functionalized polypropylene is 0.005-0.75 wt % of the total composition.

Further the invention relates to a nucleating agent for a composition comprising a polypropylene-based polymer, wherein the nucleating agent comprises talc and a functionalized polypropylene grafted with an acid or acid anhydride functional group, wherein the polypropylene-based polymer and the functionalized polypropylene are different.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES 1-2 AND COMPARATIVE EXPERIMENTS A, B and 3D

The samples were prepared using a propylene homopolymer, Sabic® PP 579S, having a melt flow index (MFI) of 47 dg/min.

The propylene homopolymer powder was extruded in a twin screw extruder. In all samples 0.1 wt % of the stabilizer Irganox B225 was added. Talc and functionalized polypropylene were added in various amounts as indicated in Table 1. The amounts of components indicated in Table 1 are based on the total composition. The talc was a surface modified talc (Steamic OOSD). The functionalized polypropylene was propylene homopolymer modified with maleic anhydride (Exxelor PO 1020). These additives were mixed with the propylene homopolymer prior to dosing it to the hopper of the extruder.

The temperature profile in the extruder was 20-20-40-100-170-230-240-240-240° C., at a throughput of 10 kg/h at 300 rpm.

The samples from the compounding step were injection moulded into test specimens using an Arburg 60T injection-moulding machine. For mechanical measurements 65*65*3.2 mm thick test plaques (ISO 37/2) and 150*10*4 mm tensile bars (ISO 527/1A) were moulded.

EXAMPLE 4 AND COMPARATIVE EXPERIMENT C and 5E

The experiments were performed in the same way as examples 1-2 and 3D except that the final composition was obtained by preparing a masterbatch and melt-mixing the masterbatch and the propylene homopolymer. The ratio between the masterbatch and the propylene homopolymer was adjusted to obtain the desired final composition. The masterbatch was produced on a WP3033 extruder containing 47.7 wt % of propylene homopolymer Sabic® PP 579S, 50 wt % of talc, 2 wt % of functionalized polypropylene and 0.3 wt % of Irganox B225.

Testing

The mechanical properties of the samples were determined as follows:

Flow was determined by measuring the melt flow index (MFI), also called melt flow rate or melt index, according to ISO1133 (2.16 kg/230° C.).

Stiffness was determined by measuring the flexural modulus according to ASTM D790 at 23° C., parallel and perpendicular orientation. Before testing the samples were conditioned for 14 days at 23° C. at 50% relative humidity.

Tensile strength was determined at 23° C. according to ISO37/2 and to ISO 527/1A (test manual 40), parallel orientation. Before testing the samples were conditioned for 14 days at 23° C. at 50% relative humidity.

The elongation-at-break was determined according to ISO 527/1A (test manual 40), parallel orientation. Before testing the samples were conditioned for 14 days at 23° C. at 50% relative humidity.

The crystallization temperature was determined by means of differential scanning calorimetry (DSC). The measurement was carried out in accordance with ISO11357-1 to ISO11357-5 using a first heating step at a heating rate of 10° C. per minute up to 200° C., a dynamic crystallization at a cooling rate of 10° C. per minute down to 70° C. and a second heating step at a heating rate of 10° C. per minute up to 200° C. The melting point is the temperature at which the enthalpy versus temperature curve measured during the second heating step displays a maximum.

The results of the tests are shown in Table 1.

Results

By the addition of functionalized PP to a small amount of talc, Tc can be obtained which is comparable to Tc where a higher amount of of talc is added (ex. 2: 0.5 wt % vs comp. ex. B: 5 wt %). The lower amount of talc reduces the decrease in EAB.

Hence, a combination of good Tc, EAB and flexural modulus may be obtained by the combination of the specific ranges of functionalized PP and talc as described herein. Within this range, higher amount of talc leads to higher flexural modulus and higher Tc and lower EAB. In order to avoid the decrease in EAB, lower amount of talc is preferred.

The invention claimed is:

1. A polypropylene composition comprising
  (A) a propylene-based polymer,
  (B) talc, and
  (C) a functionalized polypropylene grafted with an acid or acid anhydride functional group,
  wherein components (A) and (C) are different,
  wherein the amount of the talc in the composition is 0.025-4 wt % of the total composition and the amount of the functionalized polypropylene is 0.005-0.75 wt % of the total composition.

TABLE 1

| | | Example | | | | | | | |
|---|---|---|---|---|---|---|---|---|---|
| | | A | B | 1 | 2 | 3D | 4 | 5E | C |
| Talc | | 0.05 wt % | 5.0 wt % | 0.05 wt % | 0.5 wt % | 5.0 wt % | 0.5 wt % | 5.0 wt % | 10 wt % |
| Functionalized polypropylene | | — | — | 0.5 wt % | 0.5 wt % | 0.5 wt % | 0.02 wt % | 0.2 wt % | 0.4 wt % |
| masterbatch | | no | no | no | no | no | yes | yes | yes |
| MFI | dg/min | 44.7 | 41.5 | 38.6 | 40 | 38.7 | 48.6 | 42.6 | 41.4 |
| Flexural modulus 23° C. II | N/mm$^2$ | 1717 | 2159 | 1802 | 1925 | 2262 | 1976 | 2389 | 2615 |
| Flexural modulus 23° C. L | N/mm$^2$ | 1721 | 2113 | 1820 | 1967 | 2279 | 1990 | 2404 | 2607 |
| Tensile strength ISO 37/2 | N/mm$^2$ | 34.4 | 37 | 36.5 | 36.8 | 37.9 | 36.4 | 36.9 | 37.4 |
| Elongation at break ISO 527/1A | % | 15.6 | 11.1 | 13 | 14.3 | 13.6 | 14.9 | 14.1 | 10.1 |
| Crystallisation temperature | ° C. | 120.2 | 126.7 | 122.6 | 125.1 | 128.9 | 125.6 | 129.7 | 130.8 |

The comparisons between comp. ex. A and ex. 1 and between comp. ex. B and comp. ex. 3D show that the combination of talc and functionalized PP increases crystallization temperature (Tc).

The comparison of ex. 2 and ex. 4 shows that the addition of talc and functionalized PP as a masterbatch leads to the same degree of increase of crystallization temperature at a much lower amount. Same trend can be seen by comparison of comp. ex. 3D and ex. 5E.

The comparison of ex. 2 with comp. ex. 3D shows that Tc and flexural modulus are increased by increasing talc amount.

The comparison of ex 4 and comp. ex. 5E and C shows that the increase in the amount of talc and functionalized PP leads to increase of Tc and flexural modulus but decrease in elongation at break (EAB). When the amount of the talc and the functionalized polypropylene is very high as in comp. ex. C, the EAB is very low.

The comparison of comp. A with comp. B shows that the addition of talc increases Tc but heavily decreases EAB. However, a further addition of functionalized PP (comp. ex. 3D) further increases Tc while reducing the decrease in EAB.

2. The composition according to claim 1, wherein the acid or acid anhydride functional group is selected from the group consisting of (meth)acrylic acid and maleic anhydride.

3. The composition according to claim 1, wherein the propylene-based polymer is a propylene homopolymer or a random propylene copolymer.

4. The composition according to claim 1, wherein the amount of the talc in the composition is 0.1-1.0 wt % of the total composition.

5. The composition according to claim 1, wherein the total of components (A), (B) and (C) is at least 95 wt %.

6. The composition according to claim 1, wherein at least part of the talc is surface-modified.

7. The composition according to claim 1, wherein the surface-modified talc is surface-modified with a polar substance selected from the group of glycols, silanes, amines and amides.

8. The composition according to claim 1, wherein the composition has a crystallization temperature of at least 120° C. determined with DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C.; and at least one of a flexural modulus of at least 1700 N/mm² determined according to ASTM D790-10; a tensile strength of at least 35 N/mm² determined according to ISO 37/2 and an elongation at break of at least 12% determined according to ISO 527/1A.

9. A process for the preparation of the composition according to claim 1, comprising melt mixing (A), (B) and (C).

10. The process according to claim 9, comprising preparing a masterbatch by melt-mixing a portion of (A) the propylene-based polymer, (B) the talc, (C) the functionalized polypropylene and melt-mixing the masterbatch and remainder of (A) the propylene-based polymer.

11. A method for processing the composition of claim 1, comprising processing the composition in injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, thermoforming or thin-walled injection moulding.

12. An article comprising the composition of claim 1.

13. The article according to claim 12, wherein the article is an automotive part.

14. A method for increasing the crystallization temperature of a composition, the method comprising combining 0.025-4 wt % talc and 0.005-0.75 wt % of a functionalized polypropylene grafted with an acid or acid anhydride functional group, based on a total weight of the composition, with the composition, the composition comprising a propylene-based polymer, wherein the polypropylene-based polymer and the functionalized polypropylene are different.

15. The composition according to claim 5, wherein the total of components (A), (B) and (C) is at least 98 wt % of the total composition.

16. The composition according to claim 6, wherein at least 80 wt % of the talc is surface-modified.

17. The method according to claim 14, wherein an amount of the talc in the composition is 0.1-1.0 wt %, based on the total weight of the composition.

18. The composition according to claim 17, wherein the amount of the functionalized polypropylene is 0.01-0.5 wt % of the total composition.

19. The composition according to claim 4, wherein the amount of the functionalized polypropylene is 0.01-0.5 wt % of the total composition.

* * * * *